(12) United States Patent
Nemanick et al.

(10) Patent No.: US 11,713,140 B2
(45) Date of Patent: Aug. 1, 2023

(54) LITHIUM ION BATTERY DE-ORBITER

(71) Applicant: The Aerospace Corporation, El Segundo, CA (US)

(72) Inventors: Eric Joseph Nemanick, Santa Monica, CA (US); John H. Schilling, Lancaster, CA (US); John D. Desain, Redondo Beach, CA (US); Andrea G. Hsu, El Segundo, CA (US); Brian B. Brady, Seal Beach, CA (US); Andrew C. Cortopassi, Lakewood, CA (US)

(*) Notice: Subject to any disclaimer, the term of this patent is extended or adjusted under 35 U.S.C. 154(b) by 480 days.

(21) Appl. No.: 16/898,537

(22) Filed: Jun. 11, 2020

(65) Prior Publication Data

US 2021/0387752 A1    Dec. 16, 2021

(51) Int. Cl.
| | |
|---|---|
| *B64G 1/24* | (2006.01) |
| *H01M 10/0525* | (2010.01) |
| *H01M 10/615* | (2014.01) |
| *B64G 1/62* | (2006.01) |
| *B64G 1/26* | (2006.01) |
| *B64G 1/42* | (2006.01) |
| *H01M 50/30* | (2021.01) |
| *H01M 50/35* | (2021.01) |

(52) U.S. Cl.
CPC .............. *B64G 1/242* (2013.01); *B64G 1/26* (2013.01); *B64G 1/425* (2013.01); *B64G 1/62* (2013.01); *H01M 10/0525* (2013.01); *H01M 10/615* (2015.04); *H01M 50/35* (2021.01); *H01M 50/394* (2021.01); *H01M 2220/20* (2013.01)

(58) Field of Classification Search
CPC .............. B64G 1/24; B64G 1/26; B64G 1/62
See application file for complete search history.

(56) References Cited

U.S. PATENT DOCUMENTS

| | | | |
|---|---|---|---|
| 6,051,341 A  * | 4/2000 | Terasaki ................ | H01M 4/668 |
| | | | 429/234 |
| 6,419,191 B1 | 7/2002 | Hoyt et al. | |
| 6,830,222 B1 | 12/2004 | Nock et al. | |
| 9,236,593 B2 * | 1/2016 | Chuang ............ | H01M 10/6563 |
| 10,689,132 B2 * | 6/2020 | Peterka, III ............ | B64G 1/242 |
| 2015/0211499 A1 * | 7/2015 | Morin ................... | F03H 1/0093 |
| | | | 60/203.1 |
| 2018/0010586 A1 * | 1/2018 | Lichtin ................. | B64G 1/428 |
| 2018/0069220 A1 * | 3/2018 | Yuan ................... | H01M 50/434 |
| 2021/0210798 A1 * | 7/2021 | Vincent .............. | H01M 10/615 |

FOREIGN PATENT DOCUMENTS

| | | |
|---|---|---|
| RU | 2628549 C2 | 8/2017 |
| WO | 2020021696 A1 | 1/2020 |

\* cited by examiner

*Primary Examiner* — Timothy D Collins
*Assistant Examiner* — Terri L Filosi
(74) *Attorney, Agent, or Firm* — LeonardPatel PC

(57) ABSTRACT

A de-orbiting system for a space vehicle may include one or more lithium ion (Li-ion) batteries configured to release hot gases to be used for thrusting during de-orbiting of the apparatus. The system may also include one or more heaters surrounding each of the one or more Li-ion batteries, which are configured to send each of the one or more Li-ion batteries into a thermal runaway. The thermal runaway causes the one or more Li-ion batteries to release stored electrochemical energy within each of the one or more Li-ion batteries.

21 Claims, 8 Drawing Sheets

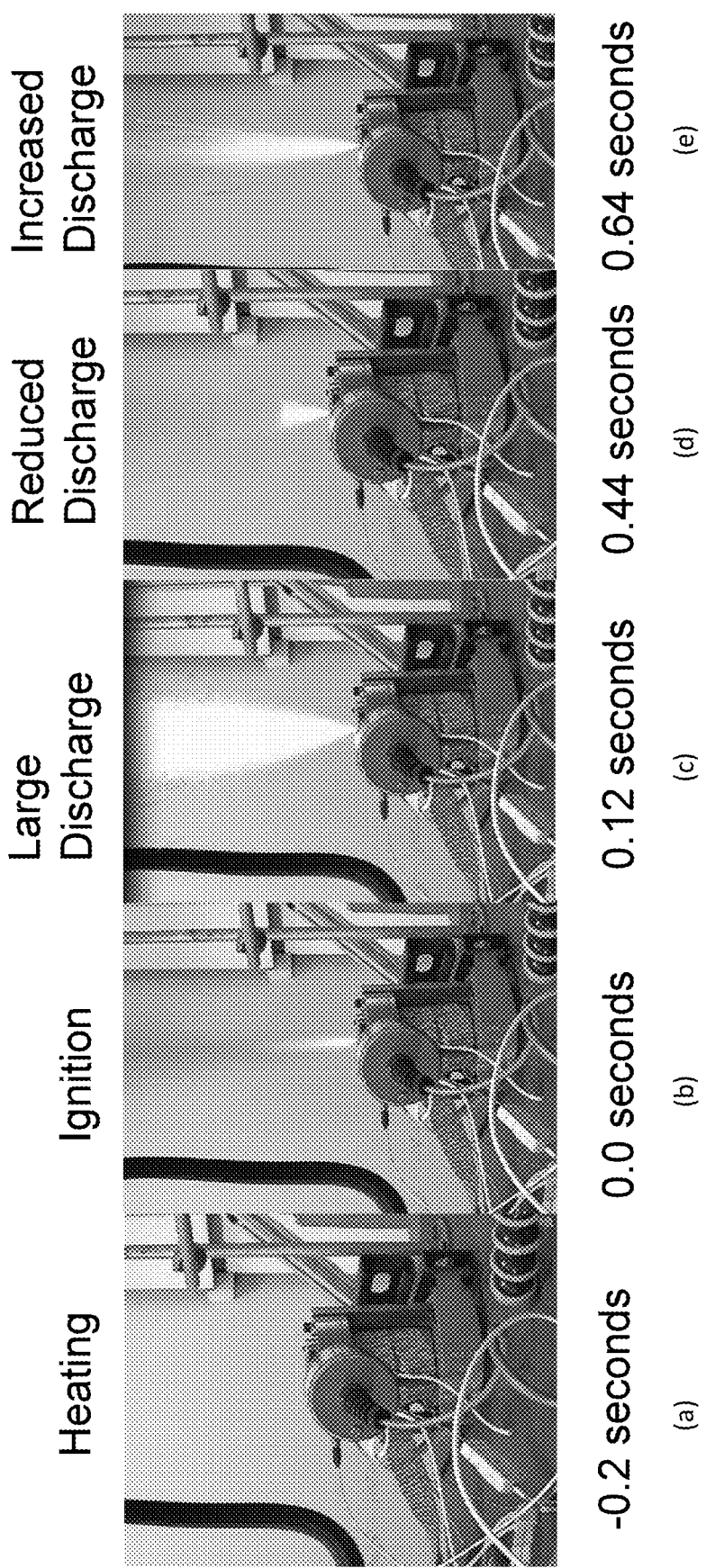

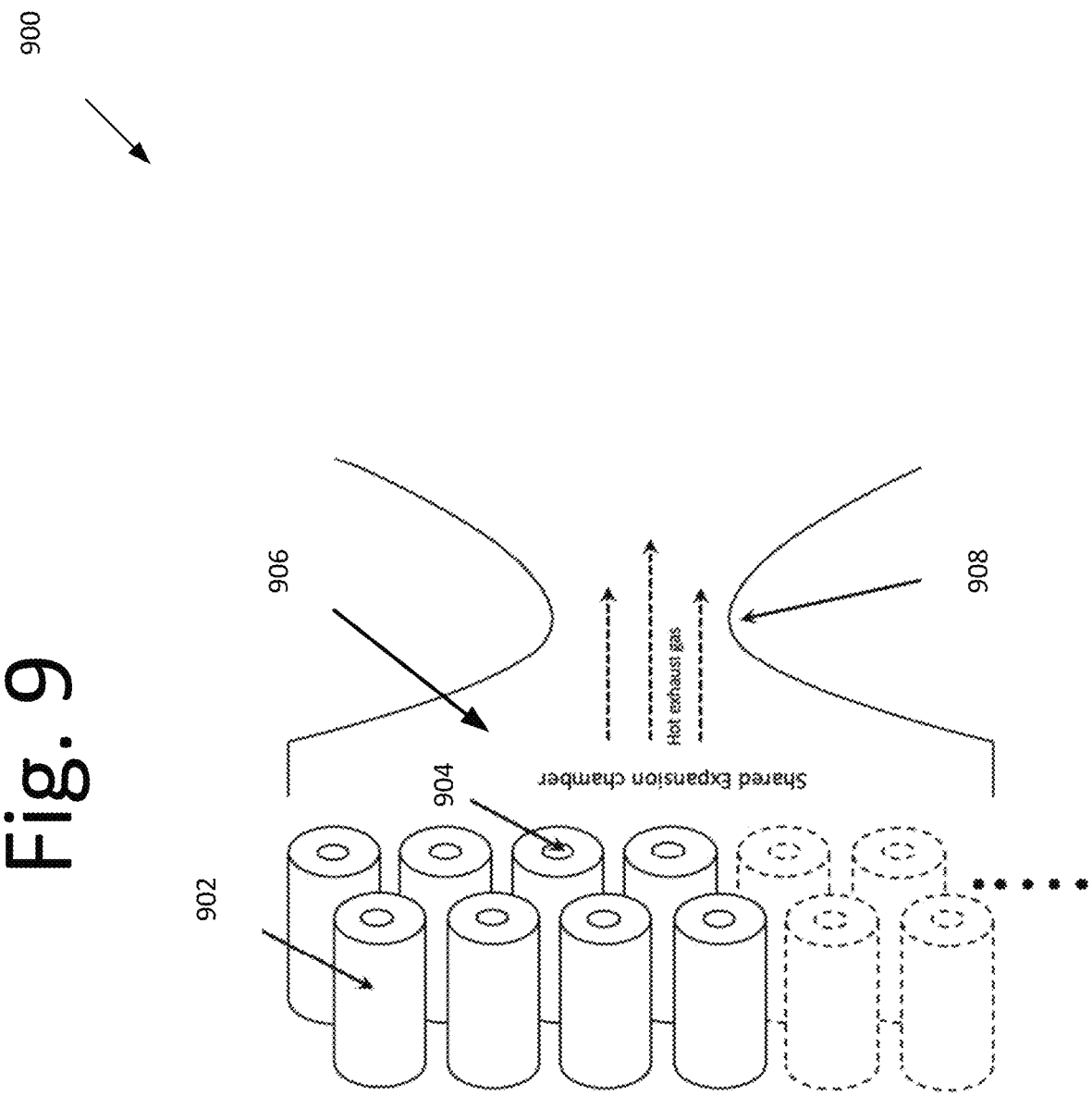

LITHIUM ION BATTERY DE-ORBITER

FIELD

The invention relates to a process of de-orbiting objects, and more particularly, to a battery-based thruster for the process of accelerating the process of de-orbiting.

BACKGROUND

Currently, small satellites must wait for atmospheric drag to deorbit at the end of life. This often takes decades, creating space junk, and leaves these small satellites in orbit, increasing the risk of creating additional space debris through collisions. In addition, these small satellites often have insufficient battery passivation capability, creating a risk of a battery explosion while waiting to deorbit, which could generate additional pieces of space debris. United States Orbital Debris Mishap Standard Practice requires an end of lifetime of no more than 25 years and encourages the use of any means that can lower that number further. In addition, it requires that the chance of accidental explosion from stored energy needs to be less than one in a thousand for safe operation and debris minimization.

At the end of mission life, small satellites are deactivated, with stored energy sources passivated, and active control is ceased. The small satellites are typically left to deorbit passively through atmospheric drag. In addition to being debris themselves, these small satellites are at risk of generating significant amounts of additional debris in the event of a collision, battery explosion, or micro-meteorite impact.

Further, small satellites typically do not have independent deorbit capabilities due to their small size and low mass. Many lack any active propulsion device which makes a deorbit burn impossible.

However, small satellites do have stored energy in a convenient and untapped source, the electrical power system. These small satellites power systems currently utilize almost exclusively lithium ion (Li-ion) batteries for operations. Thus, modifying the already existing electrical power system to utilize the stored energy within the Li-ion batteries to create thrust is a no-mass-added capability that would be beneficial for small satellites, especially ones that do not carry a dedicated propulsion system. This thrust is useful for creating a deorbit thrust burn reducing orbital lifetime and/or for allowing collision avoidance maneuvers to a space vehicle that does not carry an independent propulsion system.

SUMMARY

Certain embodiments of the present invention may provide solutions to the problems and needs in the art that have not yet been fully identified, appreciated, or solved by current de-orbiting technologies. For example, some embodiments of the present invention pertain to using Li-ion batteries to de-orbit satellites (e.g., small satellites) faster.

In an embodiment, a method for de-orbiting a space vehicle using one or more Li-ion batteries includes orienting, by an attitude control system, the space vehicle for de-orbiting. The method also includes activating an attitude control system of the space vehicle to assure a thrust axis of the space vehicle remains aligned during burn, triggering a thermal runaway of each of the one or more Li-ion batteries. The method further includes releasing, by a vent for each of the one or more Li-ion batteries, hot gasses into a thruster or expansion chamber for de-orbiting of the space vehicle.

In another embodiment, an apparatus includes one or more Li-ion batteries configured to release hot gases to be used for thrusting during de-orbiting of the apparatus. The apparatus also includes one or more heaters surrounding each of the one or more Li-ion batteries configured to send each of the one or more Li-ion batteries into a thermal runaway. The thermal runaway causes the one or more Li-ion batteries to release stored electrochemical energy within each of the one or more Li-ion batteries.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 4 are images illustrating overheating of a Li-ion battery, according to an embodiment of the present invention.

FIG. 9 is a block diagram illustrating a multiple Li-ion battery cell configuration, according to an embodiment of the present invention.

DETAILED DESCRIPTION OF THE EMBODIMENTS

Some embodiments generally pertain to the use of a Li-ion battery to generate thrust to de-orbit a satellite (hereinafter "space vehicle") at end of life. Although a small satellite is referenced herein, the embodiments are not limited to small satellites and can be applied to any space vehicle that uses Li-ion batteries. Generally speaking, a Li-ion battery contains a significant amount of stored electrochemical energy for electrical power. Further, above the stored electrochemical energy, the Li-ion battery also has chemical stored energy that can be released through combustion of the internal components of the Li-ion battery.

In the embodiments discussed herein the Li-ion battery is first sent into a thermal runaway, which releases the stored electrochemical energy within the cell, generating a plume of hot combusting gasses within the Li-ion battery cell. This plume of hot gasses bursts through the Li-ion battery's existing vent and then through a nozzle, which directs the thrust force, and out to the exterior of the space vehicle. The space vehicle, which is placed in attitude control mode, may use these gases to generate thrust, allowing the space vehicle to lower or otherwise change its orbit and reduce the residual orbital time. This procedure serves a dual purpose. For example, it can not only lower the orbit of the space vehicle, but also permanently consumes the stored energy in the Li-ion battery, thereby passivating the Li-ion battery at end of life and removing the risk of a Li-ion battery explosion generating debris.

Figure 1:
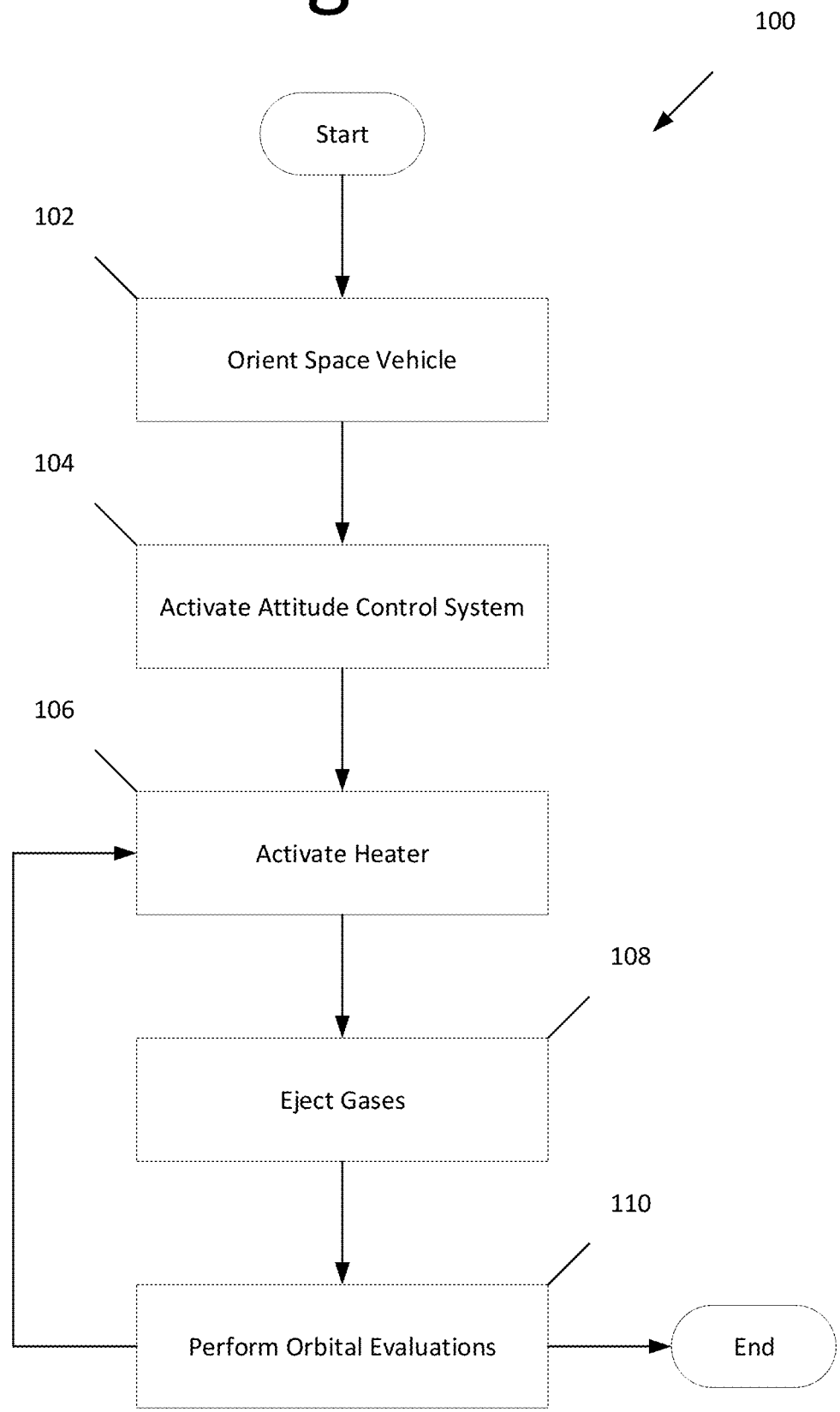
FIG. 1 is a flow diagram illustrating a method for de-orbiting a space vehicle using one or more Li-ion batteries, according to an embodiment of the present invention.

FIG. 1 is a flow diagram illustrating a method 100 for de-orbiting a space vehicle using one or more Li-ion batteries, according to an embodiment of the present invention. In some embodiments, method 100 may begin at 102 with orienting the space vehicle for deorbiting. For instance, the space vehicle is oriented by the attitude control systems onboard the space vehicle. For small satellites, this may be either reaction wheels, magnetic torquers, or a combination of both. Some small satellites, for example, have more active control through cold gas thrusters. Even small satellites with active thrust capability use reaction wheels for orientation control. This process requires some type of attitude control, but operates independently of the particular method of control and orientation.

At 104, the space vehicle's attitude control system is activated to assure the system's thrust axis remains properly aligned during the burn to efficiently reduce orbit time. Orbital time is reduced by generating thrust in the direction of orbit, and only the components of the thrust in that direction are useful to this end. This can be ensured by putting the space vehicle into a roll or spin during the burn for spin stabilization. For space vehicles without sufficient attitude control, the nozzle assembly can be shaped (i.e., with jet vanes) to provide spin stabilization through the battery thruster activation.

At 106, the cell is activated to generate a thrust. In this specific instance, the heater, which is required for normal operations, is activated to trigger a thermal runaway of the one or more Li-ion batteries. Other methods for activation of the Li-ion battery cell include, but is not limited to, mechanical force/penetration, electric spark, activated valves, or electrical overcharge. In some embodiments, the heaters or other triggering components may be powered by photovoltaics or by battery cells that are not being activated. The heaters are located within the individual Li-ion battery cell compartment with good thermal contact with the Li-ion battery. This allows individual Li-ion batteries to be ruptured without disturbing the thermal environment of neighboring Li-ion batteries. Additionally, heaters (or other activating processes) may be designed to allow rupture of a portion of the Li-ion battery to produce a higher thrust by triggering more than one Li-ion cell at once.

After activation of the Li-ion battery cell, the full energy stored therein is released as heat and expanding gasses. With temperatures reaching in excess of 1000° C., these combusting gasses are ejected from the one or more Li-ion batteries, which are used for de-orbiting purposes, at 108. The expanding gasses can then be shaped using a nozzle to generate thrust. This system can also be scaled for multiple cell activations. For example, the combustion gases may be vented (or navigated) from the one or more Li-ion batteries and navigated to a common chamber connected to the thruster nozzle. In one embodiment, one or more nozzles may vent the combustion gases from the common chamber.

At 110, an orbital evaluation is performed by the computing system onboard of the space vehicle. If the computing system determines that additional de-orbiting maneuvers are required, then the method returns to 106. To activate any remaining Li-ion battery cells. Otherwise, the method ends.

Figure 2:
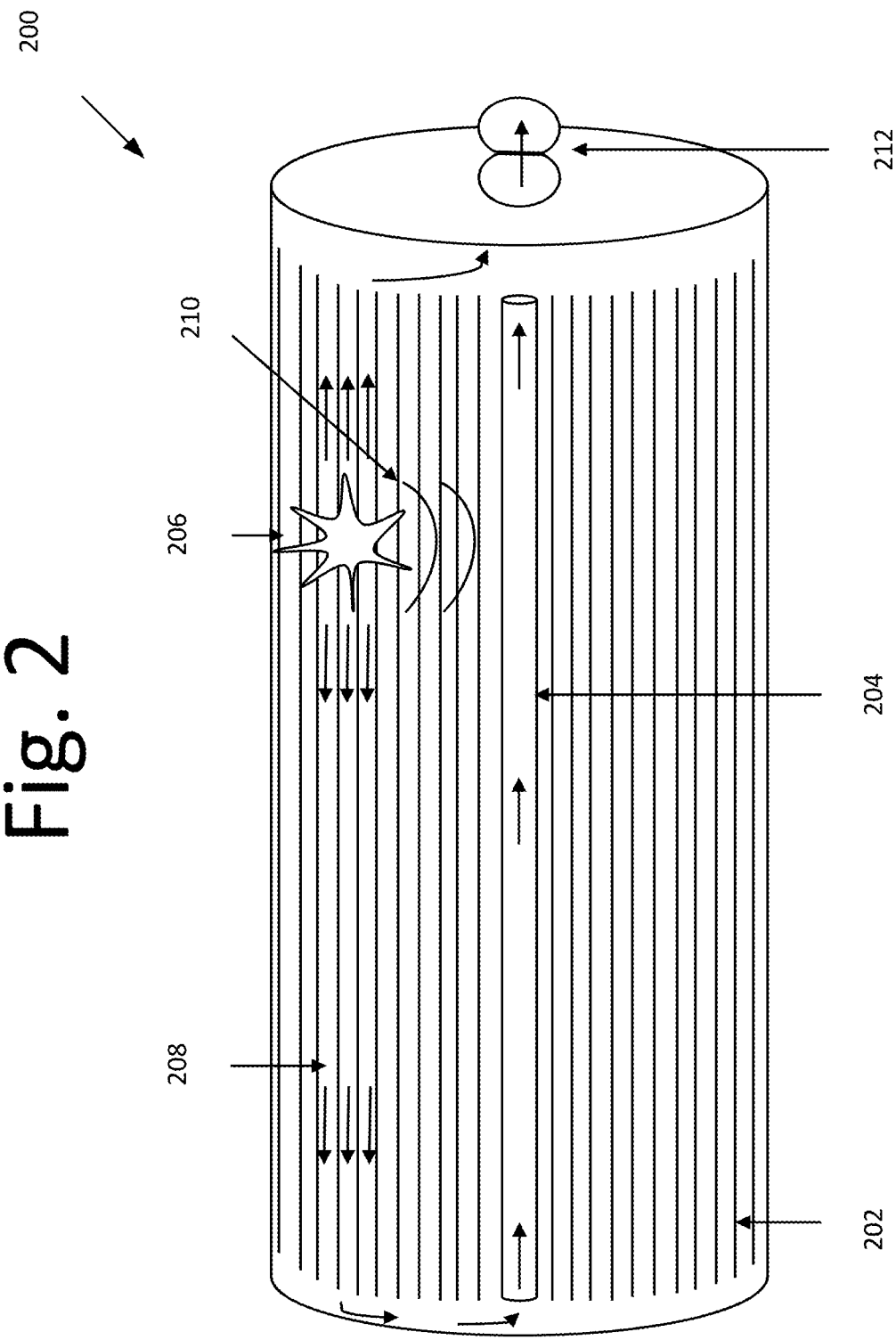
FIG. 2 is a diagram illustrating a gas generation flow in a Li-ion battery, according to an embodiment of the present invention.

FIG. 2 is a diagram illustrating a gas generation flow in a Li-ion battery 200, according to an embodiment of the present invention. As shown in FIG. 2, Li-ion battery 200 typically includes a plurality of electrode layers 202 and a central channel 204. When Li-ion battery 200 is heated, the initial activation (or combustion) may start at a single location; otherwise referred to as a short location 206. This short location 206 causes gas to flow or propagate in multiple directions through electrode layers 202, which act like gas channels. The short also generates heat, which propagates through and between electrode layers 202 to trigger further heat generation as the Li-ion battery cell components combust. See gas flow 208 and heat propagation 210. For example, gas flow 208 may be between or within electrode layers 202. As gas continues to flow through electrode layers 202, the gas may be directed to central channel 204. As gas continues to propagate through Li-ion battery 200, the gas may then be expelled out of Li-ion battery 200 via vent opening 212. This vent can be a mechanical burst disk trigger after a certain amount of pressure is applied, or an activated vent opening.

For purposes of explanation and by way of example only, an 18650 Li-ion cell, which would typically be used in a small satellite, was placed inside of a test chamber, and was intentionally driven to thermal runaway through over-heating. The test chamber was custom-designed to withstand the over-pressure event and direct the expelled gas from the failing Li-ion battery through a nozzle. The resulting chamber pressure in the pre-combustion chamber was recorded throughout the firing to estimate the thrust levels generated from the event. Positive thrust was measured from the activation. Further optimization of the purposefully driven-to-failure could be used to make a battery unit that provides de-orbiting thrust to a decommissioning small satellite in low Earth orbit.

During experimentation, the initial test was a simplified test with no overcharging of the Li-ion battery. The Li-ion battery cell was heated using heating elements similar in function to those typically used in a space vehicle. The initial ramp up in temperature was slowly activated over the course of 20 minutes. This was longer than what would happen in direct heating of a Li-ion battery on orbit. A significant pressure release event (i.e. thrust) occurred. The amount of energy and thrust released from the activated cell can be changed by increasing the state of charge of the cell prior to activation, to values even in excess of 100% state of charge.

It should be noted that the crystal structure of the Li-ion cathode is alternating layers of metals and oxygen. Fully discharged, this material (typically lithium cobalt oxide, ($LiCoO_2$, LCO), lithium nickel cobalt aluminum oxide ($LiNi_{0.8}Co_{0.17}Al_{0.03}$, NCA), lithium nickel manganese cobalt oxide ($Li_mNi_xMn_yCo_zO_2$, NMC), lithium iron phosphate ($LiFePO_4$, LFP) and others) are very stable. During normal charging, ½ or more of the Li-ions are removed, creating an oxidizing material with a potential in excess of 4 V vs. Li/Li'. The amount of Li that is extracted is limited in normal operation to prevent the material from spontaneously forming (in the case of LCO) $Co_3O_4$, oxygen, and heat.

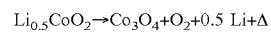

$$Li_{0.5}CoO_2 \rightarrow Co_3O_4 + O_2 + 0.5\ Li + \Delta$$

During heating, the organic electrolyte evaporates, eventually the vapor pressure of the electrolyte can reach the designed burst pressure of the burst disk of the battery vent.

This overpressure will automatically open the mechanical vent (burst disk) of the cell. When heated past ~140° C. internal temperature, the polymer separator keeping the oxidizing cathode and the reducing anode (or fuel) melts. The two materials, cathode and anode, oxidizer and fuel, touch and release their stored battery energy, both the electrochemically stored energy as well as the chemical energy of combustion of the battery materials. This heats the adjacent partially delithiated cathode, causing spontaneous decomposition forming oxygen and heat, which rapidly spreads the thermal runaway condition causing combustion of the cell's contents in the exhausting plume. The high temperature and intimate contact of the cathode with the aluminum substrate even ignites the aluminum as an additional source of fuel, in addition to combusting the remaining polymer separator and organic electrolytes.

Figure 3:
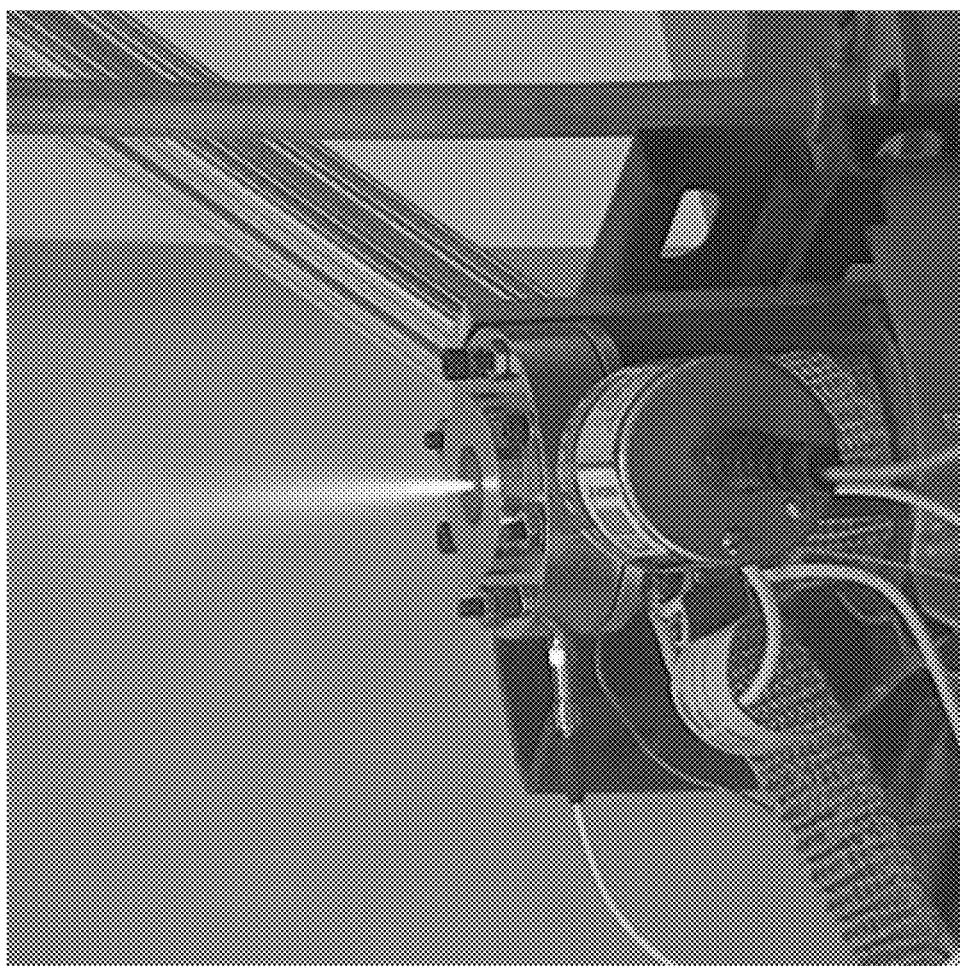
FIG. 3 is an image illustrating a Li-ion battery discharge event, according to an embodiment of the present invention.

FIG. 3 is an image 300 illustrating a Li-ion battery discharge event, according to an embodiment of the present invention. In image 300, the Li-ion cell contents have gone into thermal runaway, with the highly oxidizing cathode becoming thermally unstable, and reacting with the organic electrolyte, polymer separator, and carbon anode forming hot gasses. Heat generated melts the aluminum substrate, which also ignites releasing more heat. The gasses were expelled from the cell through a burst disk into a nozzle. Measurements of the thrust generated confirmed that activation of a Li-ion battery cell could serve as a method to deorbit a space vehicle.

FIG. 4 are images 400(a)-400(e) illustrating overheating of a Li-ion battery, according to an embodiment of the present invention. In this example, a single Li-ion 18650 battery (or cell) was placed in a block with a pressure gauge in the expansion chamber, an exhaust nozzle, and wrapped with a heater. The cell was overheated and went into thermal runaway. Images 400(a)-(e) show cell activation at various stages (i.e., heating, ignition, large discharge, reduced discharge, and increased discharge) and the associated time for each stage. Specifically, image 400(a)-(e) of FIG. 4 show the evolution of a thrust event caused by the rupturing of the Li-ion battery during thermal runaway. The first frame (a) shows the thruster during heating of the battery. The next frame (b) captures the bursting of the Li-ion cell and the initial expulsion from the thruster. The following frame (c) shows that plume rapidly evolves to contain combusting gases, with the next two frames (d) and (e) showing unsteady burning with waxing and waning of the combustion throughout the ~1 second thrust event.

Figure 5:
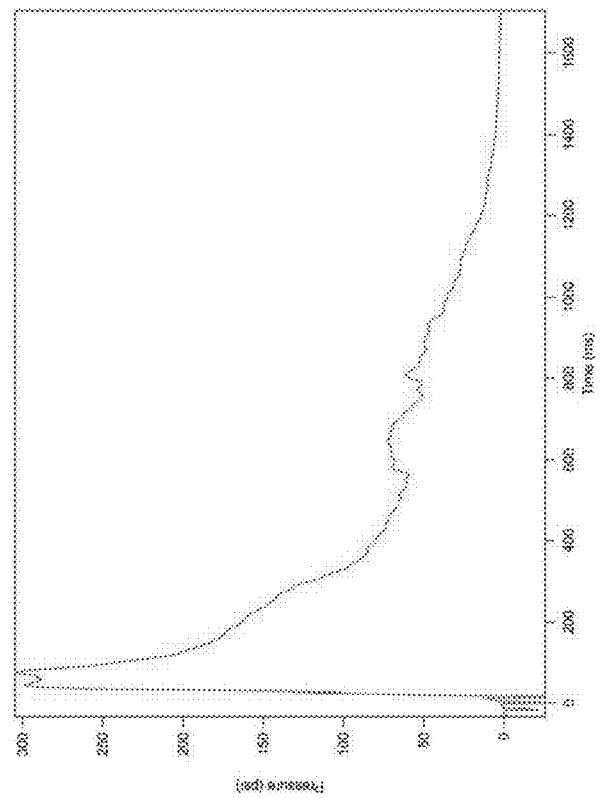
FIG. 5 is a graph illustrating the evolution of the pressure released from the Li-ion battery cell during a pressure release event, according to an embodiment of the present invention.

FIG. 5 is a graph 500 illustrating the evolution of the pressure released from the Li-ion battery cell during a pressure release event, according to an embodiment of the present invention. As shown in graph 500, initial pressure event is likely faster than response time of the gauge. A faster pressure gauge that would have better captured the initial pressure event went off graph 500, indicating that this measured pressure was a conservative scenario for thrust calculation for this activation event.

Figure 6:
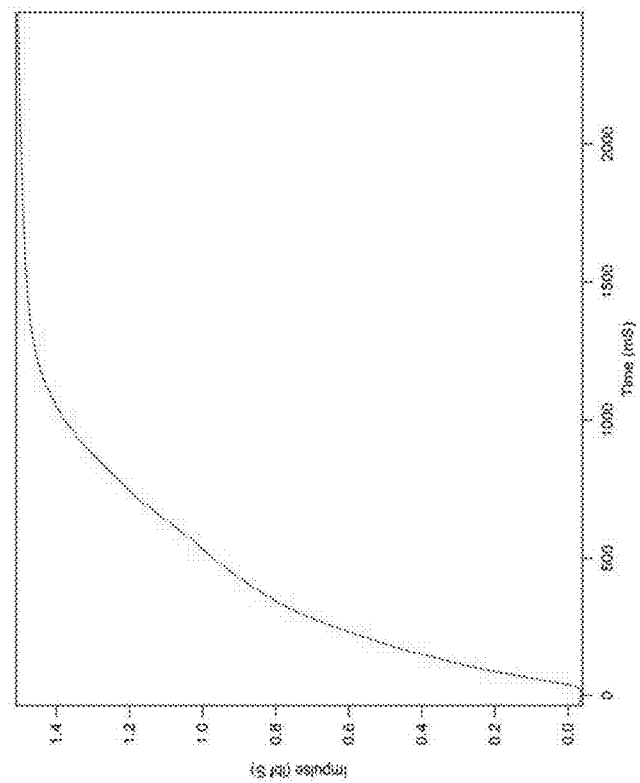
FIG. 6 is a graph illustrating the integrated pressure signal scaled by a nozzle orifice, according to an embodiment of the present invention.

FIG. 6 is a graph 600 illustrating the integrated pressure signal scaled by a nozzle orifice, according to an embodiment of the present invention. This graph indicates the total pressure impulse provided by the system as a function of time. Multiplying by the nozzle throat area and thrust coefficient (a simple geometric parameter dependent on nozzle design) provides the total thrust impulse, and thus, propulsive performance of the system.

Figure 7:
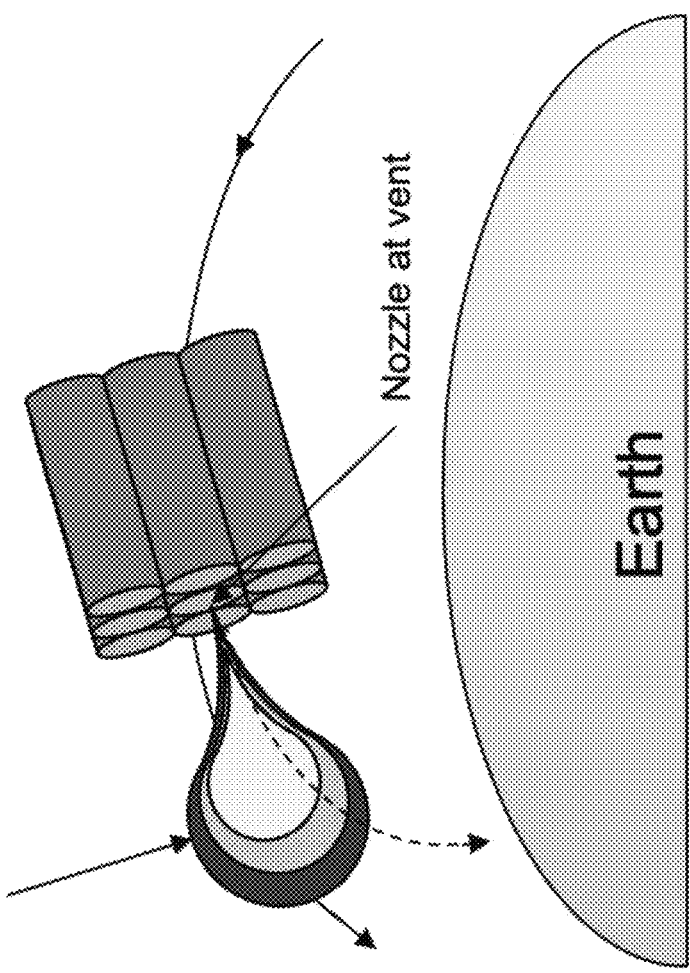
FIG. 7 is a diagram illustrating a Li-ion de-orbiter, according to an embodiment of the present invention.

FIG. 7 is a diagram illustrating a Li-ion de-orbiter 700, according to an embodiment of the present invention. In this embodiment, Li-ion de-orbiter 700 uses the end of life Li-ion batteries in a space vehicle to generate thrust to lower the orbit. Li-ion batteries are known to go into thermal runaway during failure, spewing hot gasses out their vent into the environment. This eruption can be harnessed in a space vehicle using an expansion-combustion chamber and a nozzle to convert this condition into usable thrust.

Figure 8:
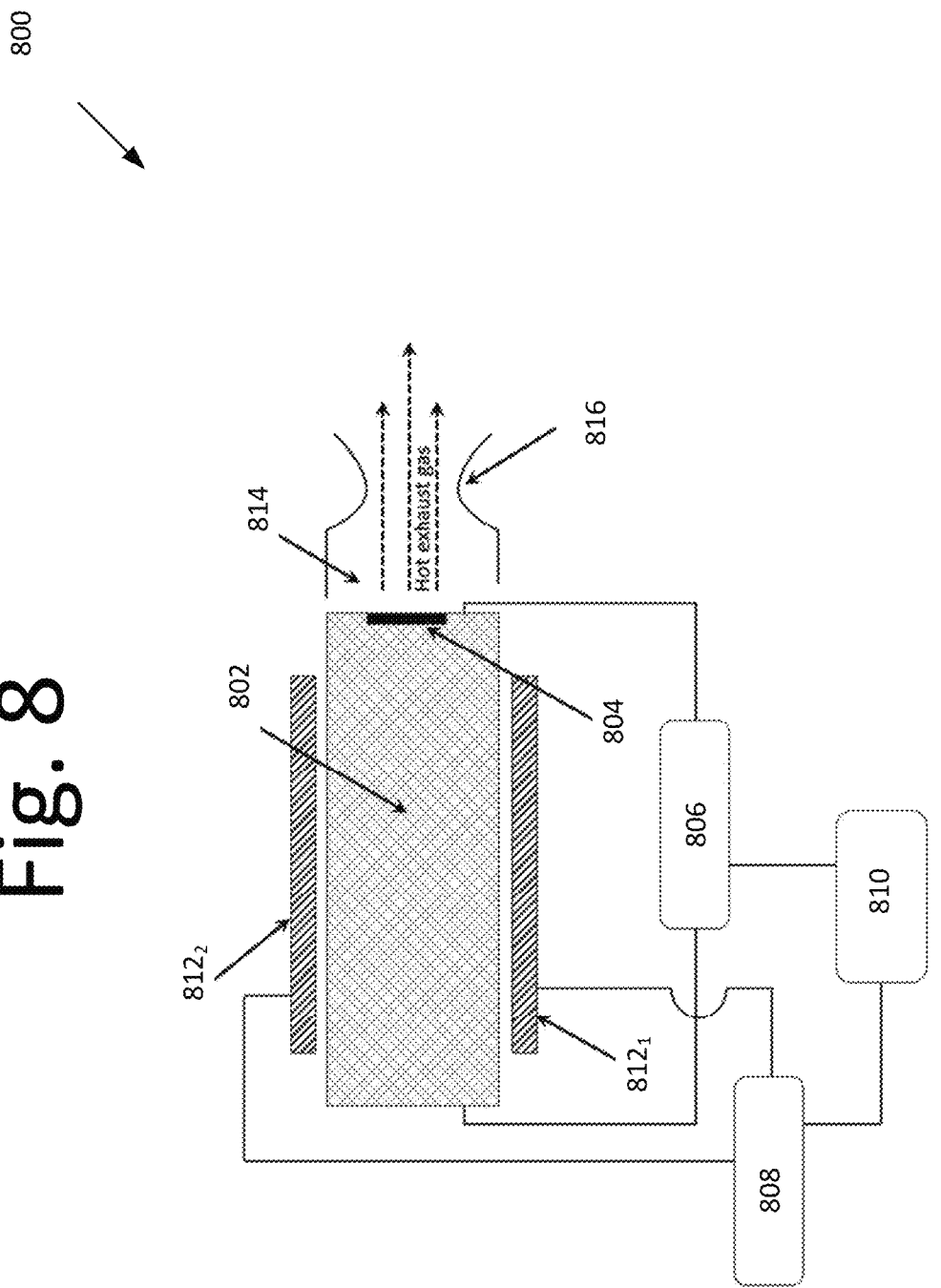
FIG. 8 is a diagram illustrating a Li-ion de-orbiter system, according to an embodiment of the present invention.

FIG. 8 is a diagram illustrating a Li-ion de-orbiter system 800, according to an embodiment of the present invention. In an embodiment, Li-ion battery 802 is connected to a battery power supply 806, which is the vehicle electrical bus. This bus supplies energy to heat the target cell either from solar arrays (or other external power sources such as a fuel cell, radioisotope thermoelectric generator, or similar), or from other cells that are not being activated. Both battery power supply 806 and heater power supply 808 are connected to a computer control unit 810, which may activate heaters $812_1$ and/or $812_2$ by way of heater power supply 808 during de-orbiting of the space vehicle. For example, computer control unit 810 may activate heaters $812_1$ and $812_2$, which in turn heat up Li-ion battery 802 or a subsection of 802 to trigger cell activation.

In an embodiment, Li-ion battery 802 can also be activated to thermal runaway through puncturing of Li-ion battery 802 either externally with an actuator or internally by pressing on a component designed to puncture the separator. Other activation procedures include an electrical spark activation where a spark gap is triggered to melt or damage the separator, overcharging Li-ion battery 802 to drive the electrodes to spontaneous breakdown, or short circuiting the cell to cause the cell to overheat and go into thermal runaway.

Li-ion battery 802, when sent into thermal runaway, releases gas from Li-ion battery vent 804. Since Li-ion battery vent 804 faces an expansion chamber 814, the gas (hot exhaust gas) is forced in a pre-defined direction. Nozzle 816 placed near expansion chamber 814 forces the gas to exit towards the exterior of the space vehicle. FIG. 9 is a block diagram illustrating a multiple Li-ion battery cell configuration 900, according to an embodiment of the present invention. In this embodiment, a plurality of Li-ion battery cells 902 share a common or expansion chamber 906 and a single gas nozzle 908. As vents 904 for each of Li-ion battery cells 902 open, whether in series or simultaneously, gas from Li-ion battery cells 902 may flow through expansion chamber 906 and out from nozzle 908.

This configuration allows for scaling, i.e., increasing the number of Li-ion battery cells, depending on how many are available on the space vehicle, the amount of thrust required, and any needed redundancy in deorbit operations. In certain embodiments, a space vehicle may have one or more banks of Li-ion battery cell thrusters, each bank containing a number of Li-ion battery cells that are to be activated. These banks can separately or collectively be connected to gas expansion chambers and thrust nozzles.

The thermal activation of a Li-ion battery can be reliably triggered using the onboard battery heater. The heater (see FIG. 8, $812_1$ and/or $812_2$), which is required for normal operations anyway, can be activated to trigger the thermal runaway of the Li-ion battery cell. The cell internal temperatures, which can reach in excess of 1000° C., may eject combusting gasses. Thermal activation of the cell(s) can also be triggered though local heating of an area or feature, that may have a lower activation temperature, and this triggering can then spread through the cell by thermal propagation of the thermal runaway process.

The vehicle can be spin-stabilized or otherwise oriented along the desired thrust vector with the exhaust nozzle in the direction of thrust. The cell(s) are triggered using the heaters powered by the photovoltaics or the stored energy in other Li-ion battery cells not being currently used for deorbiting thrust generation. The cell activates and ejects gasses into the expansion chamber and out thorough the thrust nozzle.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for generating thrust using one or more lithium ion (Li-ion) batteries, comprising:
   triggering a thermal runaway of each of the one or more Li-ion batteries;
   releasing, by a vent for each of the one or more Li-ion batteries, hot gasses into a thruster or expansion chamber, wherein the thruster or the expansion chamber comprises an exterior facing nozzle; and
   generating thrust from the one or more Li-ion batteries, wherein the generating the thrust comprises generating the thrust in the exterior facing nozzle using the hot gasses triggered from the thermal runaway.

2. The method of claim 1, further comprising:
   activating, by an onboard computing system, one or more heaters to apply heat to the one or more Li-ion batteries.

3. The method of claim 2, wherein the one or more heaters are placed in thermal contact with the one or more Li-ion batteries.

4. The method of claim 1, further comprising:
   heating of the one or more Li-ion batteries causes a rupture of a small block in the one or more Li-ion batteries to produce gas.

5. The method of claim 1, wherein the releasing of the hot gasses comprises opening a vent in each of the one or more Li-ion batteries, forcing the hot gasses to flow into the thruster or the expansion chamber.

6. The method of claim 1, further comprising:
   venting, by the exterior facing nozzle, the hot gasses from the thruster or expansion chamber and out of a space vehicle for de-orbiting.

7. The method of claim 1, further comprising:
   performing, by an onboard computing system, an orbital evaluation of a space vehicle to determine if additional de-orbiting maneuvers are required.

8. The method of claim 1, further comprising:
   orienting, by an attitude control system, a space vehicle for de-orbiting; and
   activating an attitude control system of the space vehicle to assure a thrust axis of the space vehicle remains aligned during burn.

9. An apparatus, comprising:
   one or more lithium ion (Li-ion) batteries configured to release hot gases to be used for thrusting during de-orbiting of the apparatus;
   one or more heaters surrounding each of the one or more Li-ion batteries configured to send each of the one or more Li-ion batteries into a thermal runaway, wherein the thermal runaway causing the one or more Li-ion batteries to release stored electrochemical energy within each of the one or more Li-ion batteries; and
   a thruster configured to generate thrust from the one or more Li-ion batteries, wherein the thruster is further configured to generate the thrust in an exterior facing nozzle using the hot gasses triggered from the thermal runaway.

10. The apparatus of claim 9, wherein each of the one or more Li-ion batteries comprise a plurality of electrode layers and a central channel.

11. The apparatus of claim 10, wherein, when each of the one or more Li-ion batteries are heated, an initial activation starts at a short location, causing the gas to flow or propagate through the plurality of electrode layers and into the central channel.

12. The apparatus of claim 11, wherein the short location is configured to generate heat that propagates through and between the plurality of electrode layers, triggering further heat generation as the one or more Li-ion batteries combust.

13. The apparatus of claim 9, wherein each of the one or more Li-ion batteries comprise a vent configured to open, allowing the gas to be expelled out of the one or more Li-ion batteries.

14. The apparatus of claim 9, further comprising:

an expansion chamber configured to allow gas to flow from the one or more Li-ion cells and into the exterior facing nozzle to generate thrust.

15. A space vehicle, comprising:

one or more lithium ion (Li-ion) batteries capable of generating hot gasses with temperatures in excess of 1000° C., wherein the one or more Li-ion batteries are forced into a thermal runaway ejecting the hot gasses into an expansion chamber by way of an exterior facing nozzle, allowing the space vehicle to convert the hot gasses into a usable thrust;

a vent for each of the one or more Li-ion batteries configured to open, allowing the hot gasses to be expelled out of the one or more Li-ion batteries for deorbiting purposes; and a thruster configured to generate thrust from the one or more Li-ion batteries, wherein the thruster is further configured to generate the thrust in the exterior facing nozzle using the hot gasses triggered from the thermal runaway.

16. The space vehicle of claim 15, further comprising:

one or more heaters configured to heat the one or more Li-ion batteries to trigger the thermal runaway of the one or more Li-ion batteries.

17. The space vehicle of claim 15, further comprising:

an actuator configured to puncture the one or more Li-ion batteries to trigger the thermal runaway of the one or more Li-ion batteries.

18. The space vehicle of claim 15, further comprising:

a puncturing mechanism configured to puncture the one or more Li-ion batteries by pressing on a component designed to puncture a separator of the one or more Li-ion batteries triggering the thermal runaway of the one or more Li-ion batteries.

19. The space vehicle of claim 15, further comprising:

an electrical spark activator configured to trigger a spark gap to melt or damage a separator of the one or more Li-ion batteries triggering the thermal runaway of the one or more Li-ion batteries.

20. The space vehicle of claim 15, further comprising:

a power supply configured to overcharge the one or more Li-ion batteries to drive electrodes to spontaneous breakdown, or short circuiting of the one or more Li-ion batteries to cause overheating, triggering the thermal runaway of the one or more Li-ion batteries.

21. The space vehicle of claim 15, further comprising:

an expansion chamber configured to allow gas to flow from the one or more Li-ion cells and into the exterior facing nozzle area to generate thrust.

* * * * *